United States Patent
Ehsani et al.

(10) Patent No.: US 7,601,929 B2
(45) Date of Patent: Oct. 13, 2009

(54) SYSTEM FOR DETECTING AN ALIGNMENT OF VEHICLE MOUNTED SENSORS

(75) Inventors: Saed Ehsani, Belleville, MI (US); Gyu Myeong Joh, Bloomfield Hills, MI (US); Hubert Szawarski, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 450 days.

(21) Appl. No.: 11/164,371

(22) Filed: Nov. 21, 2005

(65) Prior Publication Data
US 2007/0114218 A1    May 24, 2007

(51) Int. Cl.
*B60L 1/02*    (2006.01)
(52) U.S. Cl. ............................ 219/203; 219/200
(58) Field of Classification Search ......... 219/200–203, 219/541; 340/686.2, 635
See application file for complete search history.

(56) References Cited

U.S. PATENT DOCUMENTS

| | | | |
|---|---|---|---|
| 5,354,966 A * | 10/1994 | Sperbeck | 219/203 |
| 5,600,300 A | 2/1997 | Povilaitis | |
| 6,066,933 A | 5/2000 | Ponziana | |
| 6,670,888 B2 | 12/2003 | Schmidt et al. | |
| 6,731,219 B1 * | 5/2004 | Wheat et al. | 340/686.2 |
| 6,940,412 B2 * | 9/2005 | Clark | 340/635 |
| 2004/0257442 A1 | 12/2004 | Eggers et al. | |

* cited by examiner

*Primary Examiner*—Thor S Campbell
(74) *Attorney, Agent, or Firm*—Frank A. MacKenzie; Brooks Kushman P.C.

(57) ABSTRACT

A system for detecting an alignment of a sensor mounted on a vehicle and a method of making the same is disclosed. The system includes a vehicle windshield having the sensor mounted thereto at a predetermined location. At least one conductive strip is included having a first and a second end, wherein the conductive strip is attached to the windshield. The system further includes at least one conductive point disposed between the windshield and the sensor and mounted at the first and the second end. The conductive point establishes a closed circuit between the conductive strip and the sensor so long as the sensor is mounted to the windshield at the predetermined location. Upon displacement of the sensor from the predetermined location, an open circuit occurs between the conductive strip and the conductive point. Accordingly, the sensor generates signals indicating the misalignment of the sensor.

20 Claims, 2 Drawing Sheets

SYSTEM FOR DETECTING AN ALIGNMENT OF VEHICLE MOUNTED SENSORS

TECHNICAL FIELD

The present invention relates to a system for detecting an alignment of sensors mounted on a vehicle.

BACKGROUND

Vehicle mounted sensors are commonly known and have experienced increased usage and implementation. Particularly, vehicle windshields often have sensors mounted thereto to detect, for example, rain, the movement of windshield wipers, and/or light from oncoming vehicles. For optimal sensor performance, the sensor should be located at a designated location on the windshield. However, in some cases, the sensors, being mounted to the windshield, are displaced from the originally mounted location, thereby becoming misaligned. In such instances, sensor performance is compromised, which could affect system functionality. Thus, there exists a need for a system that detects the alignment of sensors mounted to vehicle windshields.

The present invention was conceived in view of these and other disadvantages related to displaced windshield mounted sensors.

SUMMARY

The present invention includes a system for detecting an alignment of a sensor mounted on a vehicle and a method of making the same. The system includes a vehicle windshield having the sensor mounted thereto at a predetermined location, wherein the sensor is configured to generate signals. The system also includes at least one conductive strip having a first and a second end, wherein the conductive strip is attached to the windshield. The system further includes at least one conductive point mounted at the first and the second end and disposed between the windshield and the sensor. The conductive point may be mounted to establish a closed circuit between the conductive strip and the sensor, wherein the closed circuit is maintained so long as the sensor is mounted to the windshield at the predetermined location. Additionally, the sensor generates signals indicating the alignment of the sensor with the predetermined location when the sensor is displaced from the predetermined location. Accordingly, the conductive point establishes an open circuit with the conductive strip upon displacement of the sensor from the predetermined location.

The method of making the system for detecting an alignment of a sensor mounted on a vehicle windshield includes attaching at least one sensor to the windshield at a predetermined location. The method includes attaching at least one conductive strip to the windshield, wherein the conductive strip has a first and a second end. The method further includes mounting at least one conductive point on the sensor at the first and the second end such that the conductive point is disposed between the windshield and the sensor. Additionally, the conductive point may be mounted to establish a closed circuit between the conductive strip and the sensor, wherein the closed circuit is maintained so long as the sensor is mounted to the windshield at the predetermined location. Also, the sensor generates signals that indicate the alignment of the sensor with the predetermined location when the sensor is displaced from the predetermined location. Furthermore, an open circuit exists between the conductive point and the conductive strip upon displacement of the sensor from the predetermined location.

BRIEF DESCRIPTION OF THE DRAWINGS

The features of the present invention are set forth with particularity in the appended claims. The embodiments described herein, both as to its organization and manner of operation, together with further objects and advantages thereof, may be best understood with reference to the following description, taken in connection with the accompanying drawings in which;

DETAILED DESCRIPTION OF THE PREFERRED EMBODIMENT(S)

By way of example, a system and method for implementing the present invention is described below. The system and method may be adapted, modified or rearranged to best fit a particular implementation without departing from the scope of the present invention.

Figure 1:
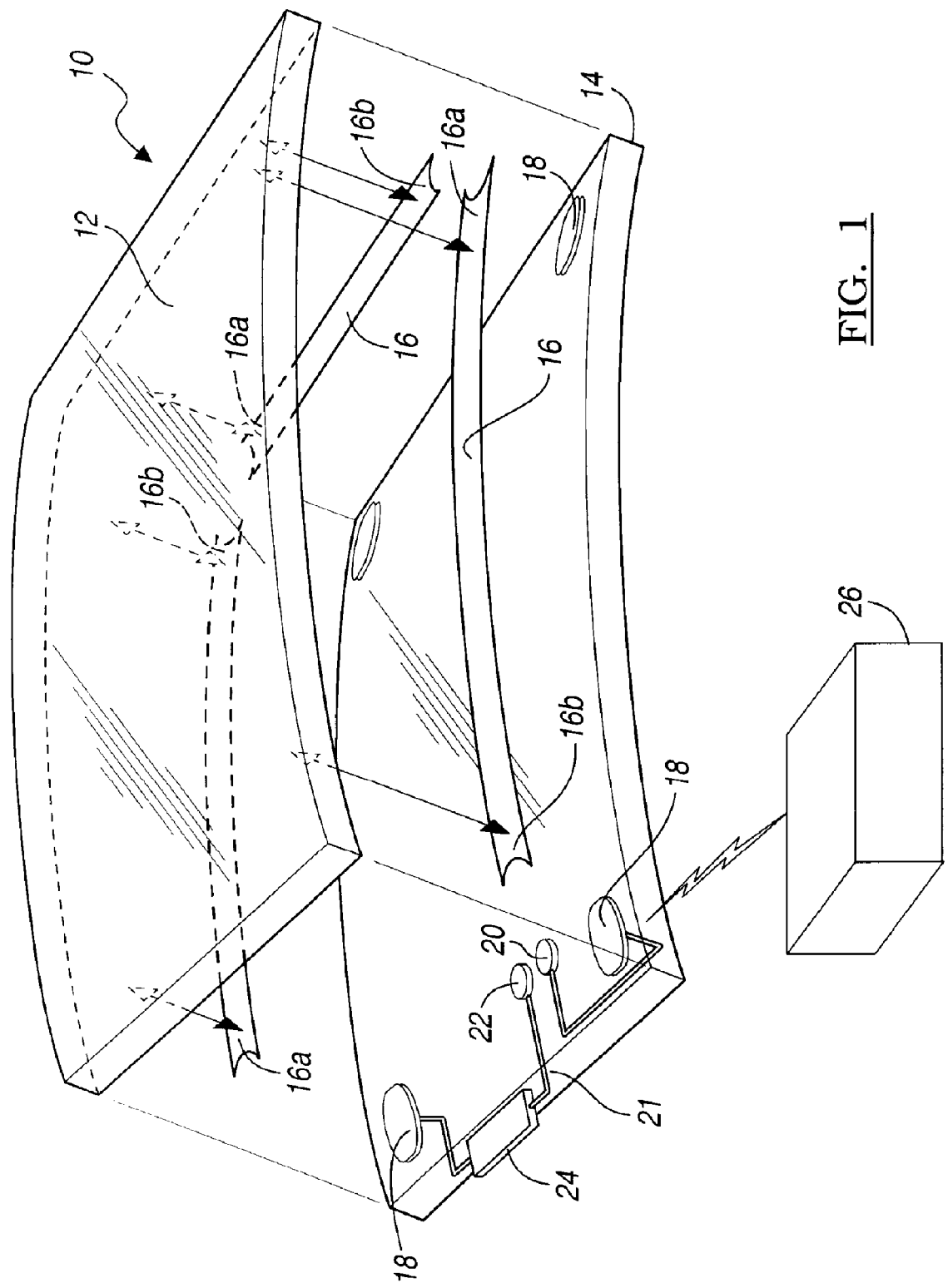
FIG. 1 illustrates a system for detecting an alignment of a windshield mounted sensor in accordance with an embodiment of the present invention.

Referring to FIG. 1, an open loop embodiment of a sensor alignment detection system 10 is illustrated. Detection system 10 includes a windshield 12 having a sensor 14 mounted thereto at a predetermined location. In one aspect, sensor 14 may be a rain sensor, a windshield wiper position sensor, and the like. In either embodiment, a plurality of conductive strips 16 is attached to windshield 12. In one embodiment, conductive strips 16 may be fused into windshield 12 and are configured to allow the flow of current. As illustrated in FIG. 1, conductive strips 16 have a first end 16a and a second end 16b, wherein each end may be connectable to a conductive point 18. As shown, windshield 12 has three conductive strips 16 attached thereto. It is recognized, that the number of conductive strips 16 may vary without departing from the scope of the present invention.

As described above, sensor 14 includes conductive points 18 that are attached thereto. In one embodiment, conductive points 18 may be attached or fused directly to sensor 14. In alternative embodiments, conductive points 18 may be attached or fused to a bracket (not shown) that secures sensor 14. In one embodiment, conductive strips 16 may be formed of copper or any other type of conductive material.

Additionally, a sensor input 22 is integrated with sensor 14 and is coupled to at least one conductive point 18 via an electrical trace 21. In one embodiment, sensor input 22 is coupled directly to a resistor 24. Resistor 24 enables the proper voltage to be applied to conductive point 18. Furthermore, a second sensor input 20 may be coupled to a ground point or a power source for powering or grounding sensor 14.

As described above, sensor 14 is mounted to windshield 12 at a predetermined location. The predetermined location for sensor 14 may be a location in which conductive strips 16 and conductive points 18 form a closed circuit when sensor 14 is mounted to windshield 12. It is recognized that the term "predetermined location" includes both the location in a cartesian coordinate system as well as any angular orientations and/or deviations. As such, if sensor 14 is displaced from the predetermined location (i.e., a closed circuit is formed between conductive points 18 and conductive strips 16 when sensor 14 is mounted to windshield 12), an open circuit is established between conductive points 18 and conductive strips 16. In the event of the open circuit, sensor 14 generates signals for a controller 26 that indicate the alignment (or misalignment) of sensor 14 with respect to windshield 12. Accordingly, controller 26 may process the signals received from sensor 14 and generate a sensor alignment notification signal that notifies a vehicle operator of the displacement of sensor 14. In one embodiment, the sensor notification may include an illuminated display on the vehicle's instrument panel or an audible notification such as a series of tones.

Figures 2A, 2B:
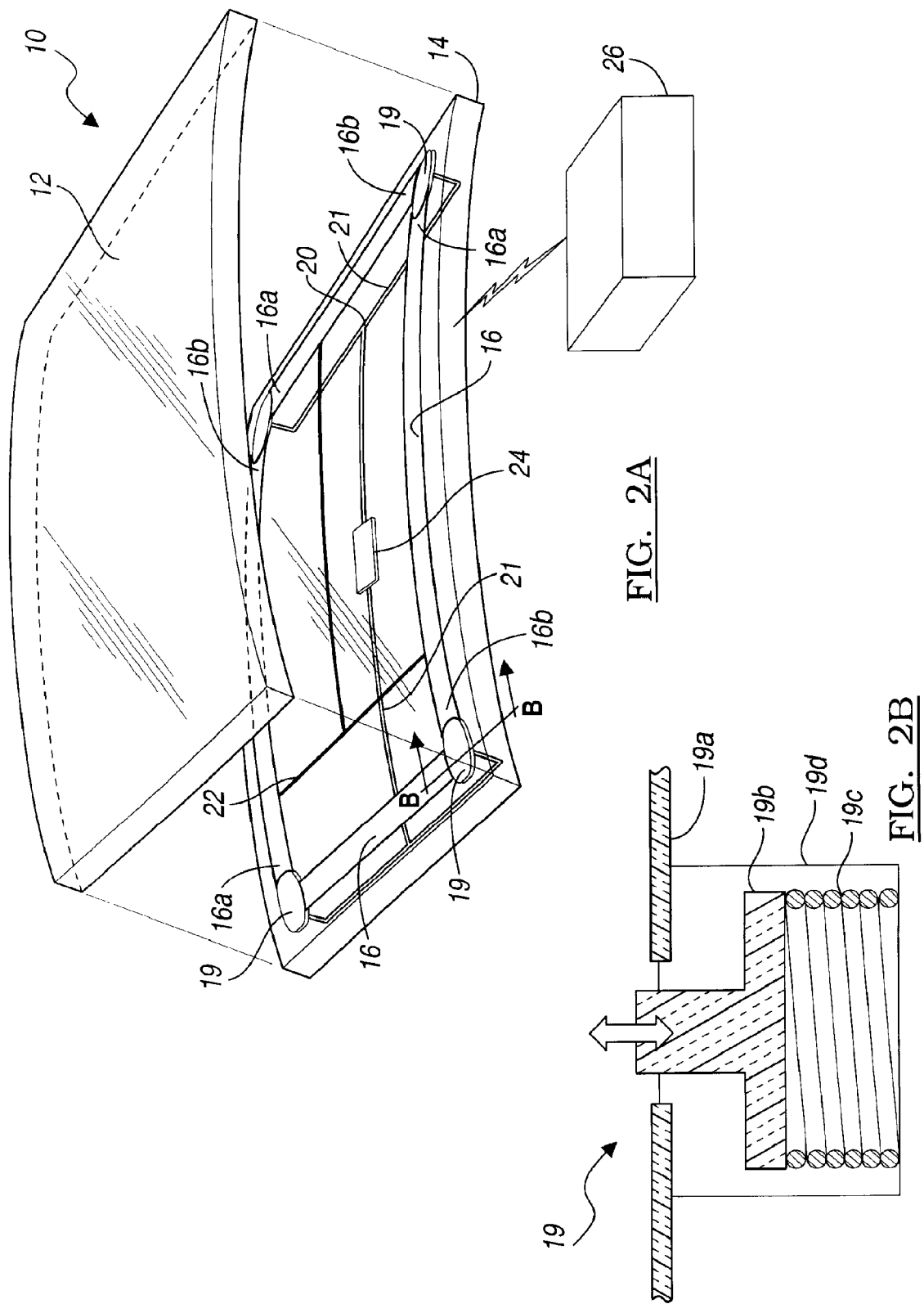
FIG. 2A illustrates a second embodiment for a system that detects an alignment of a windshield-mounted sensor.
FIG. 2B illustrates an enlarged view of a conductive point shown in FIG. 2A along line B-B in accordance with an embodiment of the present invention.

Now, referring to FIG. 2A, an alternative embodiment of sensor alignment detection system 10 is illustrated. The embodiment shown in FIG. 2A may be referred to as a closed loop implementation. As illustrated in FIG. 1, windshield 12 has sensor 14 mounted thereto at a predetermined location. Accordingly, conductive strips 16 may be attached or fused to sensor 14. In an alternative embodiment, conductive strips 16 may be attached to a bracket that secures sensor 14. FIG. 2A includes four conductive strips 16, with each conductive strip having a conductive point 19 that is connectable thereto. Sensor input 22 is included and is coupled to at least on conductive strip 16. Also, sensor input 20 is configured to have either a ground point or a power source connected thereto. Furthermore, resistor 24 may be included for the stabilization of voltages applied to conductive points 19. Sensor input 20 may be coupled to conductive points 19 through the use of electrical traces 21.

Conductive points 19 are capable of moving or oscillating in a predetermined direction. Accordingly, if sensor 14 is displaced from the predetermined location on windshield 12, conductive points 19 are capable of moving in a direction that allows the flow of current through conductive strips 16 and conductive points 19. As such, conductive point 19 may be a spring loaded switch that is normally biased in a depressed state.

Referring to FIG. 2B, an enlarged view of conductive point 19 is illustrated along line B-B of FIG. 2A. Conductive point 19 may have a housing 19d that encloses a plunger 19b and a spring 19c. Conductive material 19a may be attached or integrated with housing 19d. In some instances, to be described hereinafter, conductive material 19a is configured to enable the flow of current with adjacent conductive strips 16. Plunger 19b has a base portion that abuts a spring 19c. Additionally, plunger 19b may take on any shape or configuration without departing from the scope of the present invention.

When sensor 14, having conductive point 19 attached, is mounted at the predetermined location of windshield 12, the weight of windshield 12 causes the base of plunger 19b to press downward against spring 19c. As such, the conductive material of plunger 19b does not contact conductive material 19a while plunger 19 is in the depressed state. Thus, so long as sensor 14 is mounted at the predetermined location, conductive point 19 will remain in the depressed state and no current flows through conductive strips 16 and conductive point 19.

Alternatively, In the event sensor 14 is displaced from the predetermined location, the force from windshield 12 no longer suppresses conductive point 19. Accordingly, plunger 19b springs upward causing the conductive material of plunger 19b to contact conductive material 19a, thereby establishing a closed circuit with conductive strips 16 and allowing current flow. In response, sensor 14 generates signals for controller 26. Controller 26 processes the signals and generates a sensor alignment notification signal that may be received by a vehicle operator. As described in the foregoing, the sensor alignment notification may include, but is not limited to, a visual indication on the vehicle instrument panel and/or an audible indication.

While the best mode for carrying out the invention has been described in detail, those familiar with the art to which this invention relates will recognize various alternative designs and embodiments for practicing the invention as defined by the following claims.

What is claimed is:

1. A system for detecting an alignment of a sensor mounted on a vehicle, the system comprising:
   a vehicle windshield having the sensor mounted thereto at a predetermined location, wherein the sensor is configured to generate signals;
   at least one conductive strip having a first and a second end, wherein the conductive strip is attached to the windshield; and
   at least one conductive point mounted at the first and the second end and sandwiched between the windshield and the sensor, the conductive point being mounted to establish a closed circuit between the conductive strip and the sensor, wherein the closed circuit is maintained so long as the sensor is mounted to the windshield at the predetermined location, the sensor generating signals indicating the alignment of the sensor with the predetermined location when the sensor is displaced from the predetermined location and the conductive point establishing an open circuit with the conductive strip upon displacement of the sensor from the predetermined location.

2. The system of claim 1, further including a power source that is electrically coupled to the conductive point mounted at the first end.

3. The system of claim 2, further including a sensor input that is electrically coupled to the conductive point mounted at the second end.

4. The system of claim 1, further including a ground connection that is electrically coupled to the conductive point mounted at the first end.

5. The system of claim 1, further including a controller coupled to the sensor and configured to process the signals generated by the sensor and provide a sensor alignment notification.

6. The system of claim 1, wherein the conductive point being disposed between the windshield and the sensor includes the conductive point being fused to the windshield.

7. The system of claim 1, wherein the at least one conductive strip includes three conductive strips each having a first and a second end.

8. The system of claim 1, wherein the conductive strip being attached to the windshield includes the conductive strip being fused to the windshield.

9. A system for detecting an alignment of a sensor mounted on a vehicle, the system comprising:
   a vehicle windshield having the sensor mounted thereto at a predetermined location, wherein the sensor is configured to generate signals;
   at least one conductive strip having a first and a second end, wherein the conductive strip is attached to the sensor; and
   at least one conductive point mounted at the first and the second end and sandwiched between the windshield and the sensor, the conductive point being mounted to form an open circuit between the conductive strip and the sensor, wherein the open circuit is maintained so long as the sensor is mounted to the windshield at the predetermined location, the sensor generating signals indicating the alignment of the sensor with the predetermined location when the sensor is displaced from the predetermined location and the conductive point establishing a closed circuit with the conductive strip upon displacement of the sensor from the predetermined location.

10. The system of claim 9, wherein the conductive point is moveable and the closed circuit is established by movement of the conductive point in a predetermined direction.

11. The system of claim 10, wherein the conductive point is a spring loaded switch that is normally biased in a depressed state and upon movement of the sensor away from the predetermined location, the spring loaded switch transitions to a non-depressed state, thereby establishing a closed circuit with the conductive strip.

12. The system of claim 9, wherein the at least one conductive strip includes three conductive strips each having a first and a second end.

13. The system of claim 9, further including a power source that is electrically coupled to the conductive point mounted at the first end.

14. The system of claim 13, further including a sensor input electrically coupled to the conductive point mounted at the second end.

15. The system of claim 9, further including a controller coupled to the sensor, the controller being configured to process the signals generated by the sensor and provide a sensor alignment notification.

16. The system of claim 9, further including a ground connection that is electrically coupled to the conductive point mounted at the first end.

17. The system of claim 9, wherein the conductive point is disposed between the windshield and the sensor includes the conductive point being fused to the sensor.

18. A method of making a system for detecting an alignment of a sensor mounted on a vehicle windshield, the method comprising:
    attaching at least one sensor to the windshield at a predetermined location, wherein the sensor is configured to generate signals;
    attaching at least one conductive strip to the windshield, wherein the conductive strip has a first and a second end; and
    mounting at least one conductive point to the sensor at the first and the second end, wherein the conductive point is sandwiched between the windshield and the sensor, the conductive point being mounted to establish a closed circuit between the conductive strip and the sensor, wherein the closed circuit is maintained so long as the sensor is mounted to the windshield at the predetermined location, the sensor generating signals indicating the alignment of the sensor with the predetermined location when the sensor is displaced from the predetermined location and the conductive point establishing an open circuit with the conductive strip upon displacement of the sensor from the predetermined location.

19. The method of claim 18, wherein attaching at least one conductive strip to the windshield includes fusing the conductive strip to the windshield.

20. The method of claim 18, wherein attaching at least one conductive point to the windshield includes fusing the conductive point to the windshield.

* * * * *